United States Patent Office 3,558,614
Patented Jan. 26, 1971

3,558,614
SYNTHESIS OF TETRANUCLEAR DYES
Philip W. Jenkins, Rochester, N.Y., assignor to Eastman Kodak Company, Rochester, N.Y., a corporation of New Jersey
No Drawing. Filed Sept. 5, 1967, Ser. No. 665,274
Int. Cl. C09b 23/00
U.S. Cl. 260—240.1
12 Claims

ABSTRACT OF THE DISCLOSURE

Tetranuclear dyes derived from a 2-imidazolin-4-one, a 2-imidazolin-4-thione and a 2-imidazolin-4-selenone are prepared in good yields by condensing a quaternized merocyanine dye derived from a 2-imidazolin-4-one, a 2-imidazolin-4-thione or a 2-imidazolin-4-selenone with (1) a dialkoxyalkyl ester of an organic acid, (2) a trialkoxy alkane or aryl compound, (3) a 3,3-dialkoxy-1-alkoxypropene, (4) a 1-anilino-5-phenylimino-1,3-pentadiene or (5) a second quaternized merocyanine dye derived from a 2-imidazolin-4-one, a 2-imidazolin-4-thione or a 2-imidazolin-4-selenone, each having substituted on the carbon in the 2-position a group such as a β-acetanilidovinyl group, a 4-acetanilido-1,3-butadienyl group, and a 6-acetanilido-1,3,5-hexadienyl group.

This invention relates to certain tetranuclear cyanine dyes for sensitizing photographic emulsions and particularly to the synthesis of these dyes.

It is known to use certain cyanine dyes as spectral sensitizing dyes in photographic silver halide emulsion layers. It is also known to use certain complex dyes such as the dyes of Heseltine et al. U.S. Pat. 2,927,026, issued Mar. 1, 1960, and of French Pat. 994,762 as spectral sensitizing dyes. The synthesis of tetranuclear imidazolino cyanine dyes described in French Pat. 994,762 gives low yields. New synthetic methods are needed for the preparation in good yields of tetranuclear imidazolino cyanine dyes.

It is therefore an object of my invention to provide a valuable, novel synthesis for tetranuclear dyes derived from a 2-imidazolin-4-one, a 2-imidazolin-4-thione, and a 2-imidazolin-4-selenone. Another object is to provide a novel method for synthesizing in good yields tetranuclear dyes derived from a 2-imidazolin-4-one, a 2-imidazolin-4-thione, and a 2-imidazolin-4-selenone. Another object is to provide valuable tetranuclear cyanine dyes for use in sensitizing photographic materials. Still other objects will become evident from the following specification and claims.

These and other objects are accomplished according to my invention by the synthesis and use of my tetranuclear cyanine dyes including those represented by the formula:

I.
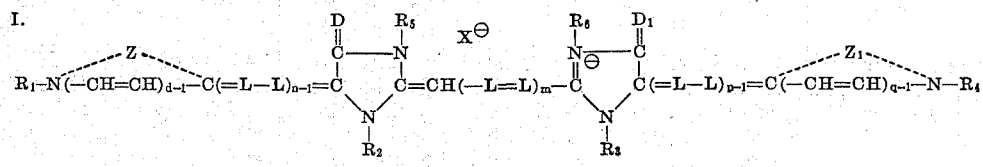

wherein $R_1$ and $R_4$ each represent the same or a different group selected from an alkyl group having from 1 to 12 carbon atoms (e.g., methyl, sulfoethyl, carboxyethyl, hydroxypropyl, sulfobutyl, carboxybutyl, hexyl, octyl, dodecyl, etc.) and an aryl group (e.g., phenyl, sulfophenyl, carboxyphenyl, tolyl, etc.); $R_2$, $R_3$, $R_5$ and $R_6$ each represent the same or different groups selected from an alkyl group (e.g., methyl, ethyl, butyl, octyl, dodecyl, etc.) and an aryl group (e.g., phenyl, tolyl, etc.); D and $D_1$ each represent an atom selected from the class consisting of oxygen, sulfur and selenium; $X^\ominus$ represents an anion (e.g., bromide, iodide, chloride, methyl sulfate, ethyl sulfate, methyl sulfonate, phenyl sulfonate, p-toluene sulfonate, perchlorate, etc.) $d$ and $q$ each represents the same or different integer of from 1 to 2; $n$, $m$ and $p$ each represent the same or different integer from 1 to 3; L represents a methine group (e.g., —CE— where E represents hydrogen, a lower alkyl group, such as methyl, ethyl, butyl, etc., and an aryl group, such as phenyl, tolyl, naphthyl, etc., such that not more than one L group per conjugated chain contains an E group that is other than hydrogen); and Z and $Z_1$ each represents the same or different nonmetallic atoms required to complete a basic heterocyclic nucleus having from 5- to 6-atoms in the heterocyclic ring, including such heterocyclic nuclei as the thiazole nucleus (e.g., thiazole, 4-methylthiazole, 4-phenylthiazole, 5-methylthiazole, 4,5-dimethylthiazole, 4,5-diphenylthiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 6-methylbenzothiazole, 5-bromobenzothiazole, 5-methoxybenzothiazole, 6-iodobenzothiazole, 5,6-dimethoxybenzothiazole, etc.), a naphthothiazole nucleus (e.g., α-naphthothiazole, β-naphthothiazole, 5-methoxy-β-naphthothiazole, 8-ethoxy-α-naphthothiazole, β,β-naphthothiazole, etc.), a thianaphtheno-7',6',4,5-thiazole nucleus (e.g., 4'-methoxythianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-ethoxybenzoxazole, 5,6-dichlorobenzoxazole, 5-hydroxybenzoxazole, etc.), a naphthoxazole nucleus (e.g., α-naphthoxazole, β-naphthoxazole, β,β-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole (e.g., α-naphthoselenazole, β-naphthoselenazole, β,β-naphthoselenazole, etc.), a thiazoline nucleus (e.g., thiazoline, 4-methylthiazoline, etc.), a pyridine nucleus (e.g., 2-pyridine, 4-pyridine, 5-methyl-2-pyridine, 3-methyl-4-pyridine, etc.), a quinoline nucleus (e.g., 2-quinoline, 4-quinoline, 3-methyl-2-quinoline, 5-ethyl-2-quinoline, 6-chloro-2-quinoline, 8-chloro-2-quinoline, 4-methoxy-2-quinoline, 8-hydroxy-2-quinoline, 6-methoxy-4-quinoline, 7-methyl-4-quinoline, 8-chloro-4-quinoline, etc.), an isoquinoline nucleus (e.g., 1-isoquinoline, 3-isoquinoline, 3-4-dihydro-1-isoquinoline, etc.), a 3,3-dialkylindolenine nucleus (e.g., 3,3-dimethylindolenine, 3,3,5-trimethylindolenine, 3,3,7-trimethylindolenine, etc.), an imidazole nucleus (e.g., 1-allylimidazole, 1-alkylimidazole, 1-alkyl-4-phenylimidazole, 1-alkyl-4,5-dimethylimidazole, etc.), a benzimidazole nucleus (e.g., 1-allyl-benzimidazole, 1-alkylbenzimidazole, 1-aryl-5,6-dichlorobenzimidazole, etc.), a naphthimidazole nucleus (e.g., 1-alkyl-α-naphthimidazole, 1-aryl-β-naphthimidazole, 1-alkyl-5-methoxy-β-naphthimidazole, etc.).

According to my invention dyes of Formula I are prepared by a condensation reaction in a mixture of a first compound having the formula:

II.

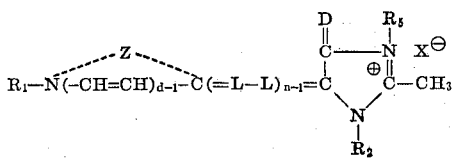

wherein $R_1$, $R_2$, $R_5$, $Z$, $d$, $L$, $n$, $D$ and $X^\ominus$ are as defined previously, and a second compound having one of the formulas:

III.

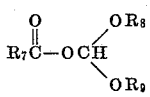

IV. $\quad L(OR_7)_3$ wherein $L$ is as defined previously; $R_7$, $R_8$ and $R_9$ each represent the same or a different lower alkyl group, e.g., methyl, ethyl, propyl, etc.

V.

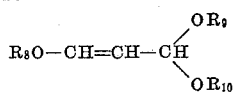

wherein $R_8$ and $R_9$ are as defined previously and $R_{10}$ is a lower alkyl group, e.g., methyl, ethyl, propyl, etc.

VI.

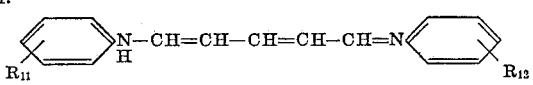

wherein $R_{11}$ and $R_{12}$ each represent the same or a different group, e.g., lower alkyl (e.g., methyl, ethyl, propyl, etc.), lower alkoxy (e.g., methoxy, ethoxy, propoxy, etc.).

VII.

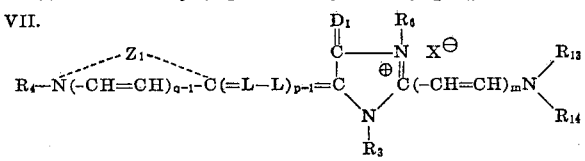

wherein $R_3$, $R_4$, $R_6$, $Z_1$, $L$, $D_1$, $X^\ominus$ $q$, $p$ and $m$ are as defined previously; $R_{13}$ represents an aryl group such as a phenyl group (e.g., phenyl, tolyl, ethylphenyl, etc.); and $R_{14}$ represents hydrogen or an acyl group (e.g., acetyl, propionyl, benzoyl, etc.). The condensation reaction mixture is advantageously heated, preferably in an inert organic solvent and preferably in the presence of an acid acceptor. The condensation reaction is accelerated by heating in the range from room temperature to the reflux temperature of the reaction mixture. Any of the inert organic solvents usually used in cyanine dye-forming condensation reactions are used to advantage, including pyridine, quinoline, benzene, toluene, nitrobenzene, ethanol, propanol, butanol, N,N-dimethylacetamide, etc. Any of the acid acceptors (basic condensing agents) usually used in cyanine dye-forming condensation reactions are used to advantage including pyridine, a trialkylamine (e.g., triethylamine, tripropylamine, triisopropylamine, tributylamine, triisobutylamine, triamylamine, etc.), an N-alkylpiperidine (e.g., N - methylpiperidine, N-ethylpiperidine, etc.), an N,N-dialkylaniline (e.g., N,N - dimethylaniline, N,N-diethylaniline, etc.), etc.

Dyes of Formula I in which $m$ is the integer 1, 2 and 3 are advantageously made by using in the condensation reaction as the second compound an intermediate of Formula III (or IV), V, and VI, respectively. A second compound of Formula VII is advantageously used in my condensation reaction with a dye of Formula II to make unsymmetrical dyes of Formula I.

The dyes of Formula II are well known and have been described in references, such as German Pat. 8052, issued Jan. 17, 1955, German Pat. 9740, issued May 2, 1955, Heseltine and Brooker U.S. Pat. 2,927,026, issued May 1, 1960. The dyes of Formula II in which D represents sulfur are derived from the appropriate 2-imidazolin - 4-thione in place of the 2-imidazolin-4-one. The dyes of Formula II in which D represents selenium are prepared from the corresponding dye in which D represents sulfur by a method similar to that described in U.S. Pat. 2,-322,433 by first treating with an alkyl salt (ester), to quaternize the acidic nucleus and then treating the quaternary salt formed (dissolved in a suitable solvent) with an alkali metal selenide, such as sodium selenide.

The intermediates of Formulas III, IV, V, and VI are known in the art, and those that are not readily available can be prepared by methods known to those skilled in the art.

The compounds of Formula VII are prepared to advantage by heating a dye of Formula II with the appropriate intermediate, such as, ethyl isoformanilide (for compounds of Formula VII where $m$ is the integer 1), anilinoacrolein anil hydrochloride (for compounds of Formula VII where $m$ is the integer 2) and glutaconicaldehydedianilide hydrochloride (for compounds of Formula VII where $m$ is the integer 3) and subsequently treating with acetic anhydride, propionic anhydride, benzoyl chloride, etc. to replace the hydrogen on the nitrogen atom with an acyl group ($R_{14}$). These condensation reactions used to make compounds of Formula VI are advantageously carried out in any of the previously mentioned inert organic solvents used in the cyanine dye-forming condensation reactions. It is advantageous to heat the reaction mixture to a temperature between room temperature and the reflux temperature for the mixture.

The invention is further illustrated by the following examples which, however, are not to be construed as limiting the invention.

EXAMPLE 1

3,3' - diethyl - 5,5'-di(3-ethyl-2-benzothiazolinylidene)-4,4' - dioxo - 1,1' - diphenylimidazolinocarbocyanine perchlorate

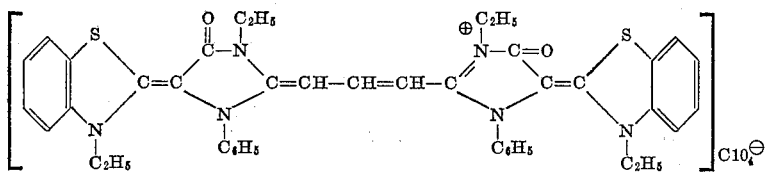

Into a reaction flask is placed 15 ml. of pyridine, 2.35 g. (1 mol.) of 3-ethyl-5-(3-ethyl-2-benzothiazolinylidene)-2-methyl-4-oxo-1-phenyl-2-imidazolinium perchlorate, 2.5 g. of diethoxymethyl acetate and 0.25 g. (1 mol.) of triethylamine. The resulting solution is heated under reflux for ten minutes. On cooling 150 ml. of water is added. The mixture is chilled for a period of twelve hours and the water is decanted. The residual oil is boiled with 15 ml. of methanol. The solution is chilled and the precipitated product collected by filtration, washed with methanol and dried. This product is recrystallized twice from boiling N,N-dimethylformamide and methanol. The resulting dye (M.P. 291.5–292.5° C., dec.) corresponding to the above indicated formula is obtained in a good yield.

EXAMPLE 2

3,3' - diethyl - 5,5' - di[(3-ethyl-2-benzoxazolinylidene)ethylidene] - 4,4' - dioxo - 1,1'-diphenylimidazolinocarbocyanine iodide

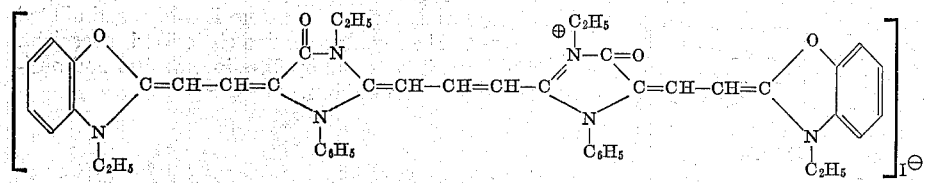

Into a reaction flask is placed 15 ml. of pyridine, 2.5 g. (1 mol.) of 3 - ethyl - 5-[3-ethyl-2-benzoxazolinylidene) ethylidene] - 2 - methyl-4-oxo-1-phenyl-2-imidazolinium iodide, and 2.0 g. of diethoxymethyl acetate. The resulting solution is heated under reflux for fifteen minutes. The reaction mixture is then cooled and diluted with water. The resulting suspension is chilled for a period of about twelve hours and the crude product is collected by filtration and dried. This crude product is boiled with 50 ml. of methanol. After chilling, the mixture is filtered and the precipitate is washed with methanol and dried. After one recrystallization from pyridine and methanol followed by recrystallization from methanol alone, the yield of pure dye, M.P. 242.0 to 244.0° C. dec., having the above indicated structure, is 29%.

EXAMPLE 3

1,1',3,3' - tetraethyl - 4,4' - dioxo-5,5'-di[(1,3,3-trimethyl-2 - indolinylidene)ethylidene]imidazolinocarbocyanine iodide

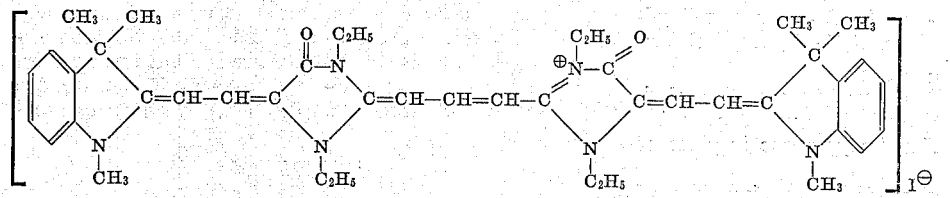

Into a reaction flask is placed 10 ml. of pyridine, 2.3 g. (1 mol.) of 1,3-diethyl-2-methyl-4-oxo-5-[(1,3,3,-trimethyl - 2 - indolinylidene)ethylidene] - 2-imidazolinium iodide and 2.5 g. of diethoxymethyl acetate. The resulting solution is heated under reflux for twenty minutes. The mixture is cooled and diluted with 200 ml. of water. The mixture is chilled overnight. The water is decanted and the residual gum is air dried. After crystallization from cresol and methanol followed by one recrystallization from the same solvents the dye of the above indicated formula, M.P. 269.5 to 270.5° C. dec., is obtained.

EXAMPLE 4

3,3'-diethyl-5,5'-di(1-ethylnaphtho[1,2 - d]thiazolin - 2-ylidene-4,4'-dioxo-1,1' - diphenylimidazolinocarbocyanine perchlorate.

Dye 4 is prepared by a method similar to that described for Dye 1 in Example 1 using 3-ethyl-5-(1-ethylnaphtho[1,2-d]-thiazolin-2-ylidene)-2-methyl-4 - oxo - 1-phenyl-2-imadazolinium perchlorate as the intermediate in place of 3-ethyl-5-(3-ethyl-2-benzothiazolinylidene)-2-methyl-4-oxo-1-2-imidazolinium perchlorate. The yield of pure dye is 41%, M.P. 240.0–241.5° C. dec.

EXAMPLE 5

3,3'-diethyl-4,4' - dioxo - 1,1' - diphenyl-5,5'-di[(1,3,3-trimethyl - 2 - indolinylidene)ethylidene]imidazolinocarbocyanine iodide.

Dye 5 is prepared by a method similar to that described for Dye 2 in Example 2 using 3-ethyl-2-methyl-4-oxo-1-phenyl - 5 - [1,3,3 - trimethyl - 2 - indolinylidene)ethylidene]-2-imidazolinium iodide as the intermediate in place of 3-ethyl-5-[(3-ethyl-2-benzoxazolinylidene)ethylidene]-2-methyl-4-oxo-1-phenyl-2-imidazolinium iodide. A good yield of pure dye, M.P. 300.0–301.0° C. dec. is obtained.

EXAMPLE 6

3,3'-diethyl-5,5'-di[(3 - ethyl - 2 - benzothiazolinylidene) ethylidene] - 4,4' - dioxo-1,1'-diphenylimidazolinocarbocyanine iodide.

Dye 6 is prepared by a method similar to that described for Dye 2 in Example 2 using 3-ethyl-5-[(3-ethyl-2-benzothiazolinylidene)ethylidene] - 2 - methyl-4-oxo-1-phenyl-2-imidazolinium iodide as the intermediate in place of 3-ethyl-5-[(3-ethyl-2-benzoxazolinylidene)ethylidene]-2 - methyl - 4-oxo-1-phenyl-2-imidazolinium iodide. The yield of pure dye is 31%, M.P. 254.0–256.0° C. dec.

EXAMPLE 7

5,5'-di[(3,3-dimethyl - 1 - δ - sulfobutyl-1H-benz(e)-indolin - 2 - ylidene)ethylidene]-3,3'-diethyl-4,4'-dioxo-1,1'-diphenylimidazolinocarbocyanine iodide disodium salt.

Dye 7 is prepared by a method similar to that described for Dye 2 in Example 2 using 5-[(3,3-dimethyl 1-δ-sulfobutyl -1H -benz(e)indolin-2-ylidene)ethylidene]-3-ethyl-4-oxo-1-phenyl-2 - imidazolinium iodide sodium salt as the intermediate in place of 3-ethyl-5-[(3-ethyl-2-benzoxazolinylidene)ethylidene]-2-methyl - 4 - oxo - 1-phenyl-2-imidazolinium iodide. The pure dye has an M.P. indefinite dec.

EXAMPLE 8

1,1',3,3'-tetraethyl - 5,5' - di[(3-ethyl-2-benzoxazolinylidene)ethylidene] - 4,4' - dioxoimidazolinocarbocyanine iodide.

Dye 8 is prepared by a method similar to that described for Dye 3 in Example 3 using 1,3-diethyl-5-[(3-ethyl-2-benzoxazolinylidene)ethylidene] - 4-oxo-2-imidazolinium iodide as the intermediate. A good yield of pure dye is obtained. M.P. 277.0–278.0° C. dec.

EXAMPLE 9

1,1',3,3',-tetraethyl - 5,5' - di[(3-ethyl-2-benzothiazolinylidene)ethylidene]-4,4' - dioxoimidazolinocarbocyanine iodide.

Dye 9 is prepared by a method similar to that described for Dye 3 in Example 3 using 1,3-diethyl-5-[(3-ethyl-2-benzothiazolinylidene)ethylidene] - 4 - oxo - 2 - imidazolinium iodide as the intermediate in place of 1,3-diethyl-2-methyl-4-oxo-5-[(1,3,3-trimethyl-2 - indolinylidene)ethylidene]-2-imidazolinium iodide. The yield of pure dye is 29%, M.P. 301.0–302.0° C. dec.

EXAMPLE 10

3,3'-diethyl - 5,5' - di[(3 - ethyl - 2-benzoxazolinylidene) ethylidene] - 1,1' - diphenyl - 4,4' - dithioxoimidazolinocarbocyanine iodide.

Dye 10 is advantageously prepared by a method similar to that described for Dye 2 but using an equimolar amount of 3-ethyl - 5 - [(3-ethyl - 2 - benzoxazolinylidene)ethylidene] - 2 - methyl - 1 - phenyl - 4 - thioxo-2-imidazolinium iodide in place of 3 - ethyl - 5 - [(3-ethyl-2-benzoxazolinylidene)ethylidene] - 2 - methyl - 4 - oxo-1-phenyl - 2 - imidazolinium iodide. Yields similar to those of Dye 2 (in Example 2) are obtained.

EXAMPLE 11

3,3'diethyl - 5,5' - di[(3 - ethyl - 2 - benzoxazolinylidene) ethylidene]-1,1',7-triphenyl - 4,4' - diselenoxoimidazolinocarbocyanine iodide.

Dye 11 is advantageously prepared by a method similar to that described for Dye 2 but using an equimolar amount of 3-ethyl - 5 - [(3-ethyl - 2 - benzoxazolinylidene)ethylidene] - 2 - methyl - 1 - phenyl - 4 - selenoxo-2-imidazolinium iodide in place of 3-ethyl-5-[(3-ethyl-2-benzoxazolinylidene)ethylidene] - 2 - methyl - 4 - oxo-1-phenyl - 2 - imidazolinium iodide and an equimolar amount of ethyl orthobenzoate in place of diethoxymethyl acetate. Yields similar to those of Dye 2 (in Example 2) are obtained.

These and other dyes of Formula I ($m=1$) are advantageously prepared in good yields by heating mixtures of still other compounds of Formula II with other compounds of Formula III (e.g., dimethoxymethyl propionate, diethoxymethyl butyrate, etc.) and Formula IV (e.g., ethyl orthoformate, ethyl orthoacetate, ethyl orthobenzoate, etc.).

EXAMPLE 12

3,3'-diethyl - 5,5' - di[(3 - ethyl - 2 - benzoxazolinylidene)ethylidene] - 4,4' - dioxo - 1,1' - diphenylimidazolinodicarbocyanine iodide.

Dye 12 is advantageously prepared by a method similar to that described for Dye 2 in Example 2 but using an equimolar amount of trimethoxypropene in place of diethoxymethyl acetate.

Similarly, other tetranuclear dicarbocyanine dyes of my invention are advantageously prepared in good yields by heating other compounds of Formula II with other compounds of Formula V including, e.g., triethoxypropene, 3,3 - diethoxy - 1 - methoxypropene, trimethoxypropene, tripropoxypropene, etc.

EXAMPLE 13

3,3' - diethyl - 5,5' - di[(3 - ethyl - 2 - benzoxazolinylidene)ethylidene] - 4,4' - dioxo - 1,1' - diphenylimidazolinotricarbocyanine iodide.

Dye 13 is advantageously prepared by a method similar to that described for Dye 2 in Example 2 but using an equimolar amount of 1-anilino - 5 - phenylimino-1,3-pentadienyl hydrochloride in place of diethoxymethyl acetate.

Similarly, other tetranuclear tricarbocyanine dyes of Formula I are advantageously prepared in good yields by heating other compounds of Formula II with other compounds of Formula VI, e.g., 1 - anilino - 5 - (4-methylphenylimino) - 1,3 - pentadiene, 1 - (4 - methylanilino) - 5 - phenylimino - 1,3 - pentadiene, 1-(2-methoxyanilino)-5-phenylimino-1,3-pentadiene, etc.

The following will illustrate the synthesis of typical unsymmetrical dyes of my invention. Good yields are obtained.

EXAMPLE 14

3,3' - diethyl - 5 - (3 - ethyl - 2 - benzothiazolinylidene) - 5' - [(3 - ethyl - 2 - benzoxazolinylidene)ethylidene] - 4,4' - dioxo - 1,1' - diphenylimidazolinocarbocyanine iodide.

Dye 14 is prepared by heating equimolar amounts of 2-($\beta$-acetanilidovinyl) - 3 - ethyl - 5 - (3 - ethyl-2-benzothiazolinylidene) - 4 - oxo - 1 - phenyl - 2 - imidazolinium perchlorate and 3-ethyl-5-[(3-ethyl - 2 - benzoxazolinylidene)ethylidene] - 2 - methyl - 4 - oxo-1-phenyl-2-imidazolinium iodide with triethylamine (1 mol and 100% excess) dissolved in pyridine. Following completion of the reaction, the hot mixture is cooled and diluted with water. The dye suspension is chilled overnight. The crude dye is collected by filtration, washed and purified by the usual procedures.

EXAMPLE 15

1,3,3' - triethyl-5'-(3-ethyl-2-benzothiazolinylidene)-4,4'-dioxo - 1' - phenyl-5-[(1,3,3-trimethyl-2-indolinylidene) ethylidene]-imidazolinocarbocyanine iodide Dye 15 is prepared by heating equimolar amounts of 2 - ($\beta$-acetanilidovinyl)-3-ethyl-5-(3-ethyl-2-benzothiazolinylidene) - 4-oxo-1-phenyl-2-imidazolinium perchlorate and 1,3 - diethyl-5-methyl-4-oxo-5-[(1,3,3-trimethyl-2-indolinylidene)ethylidene]-2-imidazolinium iodide with triethylamine (1 mol.+100% excess) dissolved in pyridine. The dye formed is separated and purified by methods similar to those described previously.

EXAMPLE 16

1,3' - diethyl - 5-(3-ethyl-2-benzothiazolinylidene)-5'-[(3-ethyl - 2 - benzoxazolinylidene)ethylidene]-4-oxo-1',3-diphenyl-4'-thioxoimidazolinocarbocyanine iodide Dye 16 is advantageously prepared by heating equimolar amounts of 2-($\beta$-acetanilidovinyl)-1-ethyl-5-(3-ethyl - 2-benzothiazolinylidene)-4-oxo-3-phenyl-2-imidazolinium perchlorate and 3 - ethyl-5-[(3-ethyl-2-benzoxazolinylidene)ethylidene] - 2-methyl-1-phenyl-4-thioxo-2-imidazolinium iodide with triethylamine (1 mol. and 100% excess) dissolved in pyridine. Following completion of the reaction the hot mixture is diluted with water. The dye suspension is chilled overnight. The crude dye is collected by filtration, washed and purified by the usual procedures.

EXAMPLE 17

3,3' - diethyl-5-[(3-ethyl-2-benzoxazolinylidene)-ethylidene] - 4,4' - dioxo-1,1'-diphenyl-5'-[(1,3,3-trimethyl-2 - indolinylidene)ethylidene]-imidazolinocarbocyanine iodide Dye 17 is advantageously prepared by heating equimolar amounts of 2 - (2-anilinovinyl)-3-ethyl-4-oxo-1-phenyl - 5 - [(1,3,3-trimethyl-2-indolinylidene)ethylidene] 2 - imidazolinium iodide and 3-ethyl-5-[(3-ethyl-2-benzoxazolinylidene)ethylidene] - 2 - methyl-4-oxo-1-phenyl-2-imidazolinium iodide, acetic anhydride and triethylamine dissolved in pyridine. Following completion of the reaction, the mixture is cooled and diluted with water. The dye suspension is chilled over night, and crude dye collected by filtration and dried giving a yield of 36%. After purification by recrystallization pure dye having a M.P. 247–248° C. dec. is obtained.

EXAMPLE 18

3,3' - diethyl - 5 - [(3-ethyl-2-benzoxazolinylidene)-ethylidene] - 5' - [(1,3,3-trimethyl-2-indolinylidene)ethylidene] - 4,4' - dioxo-1,1'-diphenylimidazolinodicarbocyanine iodide Dye 18 is advantageously prepared by a method similar to that described for Dye 17 (in Example 17) using 2 - (4 - acetanilindo-1,3-butadienyl)-1,3-diethyl-4-oxo-5-[(1,3,3 - trimethyl - 2 - indolinylidene)ethylidene]-2-imidazolinium iodide in place of the 2-anilinovinyl analog used to make Dye 17. Similarly, good yields are obtained of the purified dye.

EXAMPLE 19

3,3' - diethyl - 5 - [(3-ethyl-2-benzoxazolinylidene)-ethylidene] - 4,4' - dioxo-1,1'-diphenyl-5'-[(1,3,3-trimethyl-2 - indolinylidene)ethylidene]-imidazolinotricarbocyanine iodide Dye 19 is advantageously prepared by a method similar to that described for Dye 17 but using 2-(6-acetanilindo-1,3,5 - hexadienyl)-3-ethyl-4-oxo-1-phenyl-5-[(1,3,3-trimethyl - 2 - indolinylidene)ethylidene]-2-imidazolinium iodide in place of the 2-anilinovinyl analog used to make Dye 17. Similarly good yields are obtained of the purified dye.

Similarly other dyes of my invention are prepared by using the appropriate intermediates.

The synthesis of the intermediates of Formula VII is illustrated by the following typical example.

EXAMPLE 20

2 - (2 - anilinovinyl)-3-ethyl-5-(3-ethyl-2-benzothiazolinylidene)-4-oxo-1-phenyl-2-imidazolinium perchlorate 3 - ethyl - 5 - (3 - ethyl - 2 - benzothiazolinylidene)-2-methyl-4-oxo-1-phenyl - 2 - imidazolinium perchlorate (1 mol., 2.35 g.) and ethyl isoformanilide (1 mol.+200%, 2.25 g.) is dissolved in N,N-dimethylacetamide (15 ml.), and the solution is heated under reflux for thirty minutes. The reaction mixture is cooled and diluted with ethyl ether (350 ml.). After chilling, the ether is decanted and the residual oil is dried in a vacuum oven. The yield of product is 2.05 g. (72%). This crude dye is employed without further purification as an intermediate in the preparation of my dyes.

The good yields of dye produced by my synthesis represent a valuable technical advance over the prior art synthesis. The following comparison will illustrate this. Pure Dye 2 is prepared in a yield of 29% according to my invention in Example 2. Pure Dye 2 is also carefully prepared using the prior art type of reactions indicated in French Pat. 994,762, however, this synthesis gives only a 1% yield of the pure dye. Similarly other comparisons can be made to illustrate the technical advance for my synthesis.

My dyes are used to advantage to spectrally sensitize photographic silver halide emulsions. My photographic emulsions contain any of the silver halides or mixtures thereof dispersed in any of the hydrophilic colloids used in photographic emulsions including natural materials, e.g., gelatin, albumin, agar-agar, gum arabic, alginic acid, etc., and synthetic materials, e.g., polyvinyl alcohol, polyvinyl pyrrolidone, cellulose ethers, partially hydrolyzed cellulose acetate, etc. My dyes are especially useful for extending the spectral sensitivity of the customarily employed gelatino-silver-chloride, gelatino-silver-chlorobromide, gelatino-silver-bromide, and gelatino-silver-bromoiodide emulsions. To prepare emulsions sensitized with one or more of the novel dyes, it is only necessary to disperse the dye or dyes in the emulsions. The methods of incorporating dyes in emulsions are simple and are known to those skilled in the art. In practice, is is convenient to add the dyes to the emulsions in the form of a solution in an appropriate solvent. A mixture of methyl alcohol and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e.g., from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of my dyes, the following procedure is satisfactory.

A quantity of dye is dissolved in a mixture of methanol and pyridine and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of the dyes, from 10 to 20 mg. of dye per liter of gelatino-silver-bromide or bromoiodide emulsion (containing about 40 g. of silver halide) suffices to produce the maximum sensitizing effect. With the finer grain emulsions, a somewhat larger concentration of dye may be needed to produce the maximum sensitizing effect.

The above statements are only illustrative, as it will be apparent that the dyes can be incorporated in photographic emulsions by any of the other methods customarily employed in the art, e.g., by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of this invention can also contain such addenda as chemical sensitizers (e.g., sulfur sensitizers, such as allyl thiocarbamide, thiourea, allylisothiocyanate, cystine, etc.), various gold compounds (such as potassium chloroaurate, auric trichloride, etc.) (see U.S. Pats. 2,540,085; 2,597,856; and 2,597,915, for example), various palladium compounds (such as palladium chloride (U.S. Pat. 2,540,086), potassium chloropalladate (U.S. Pat. 2,598,079), etc., or mixtures of such sensitizers), antifoggants (e.g., benzotriazole, nitrobenzimidazole, 5-nitroindazole, etc. (see Mees: "The Theory of the Photographic Process," MacMillan Pub., 1942, p. 460), or mixtures thereof), hardeners (e.g., formaldehyde (U.S. Pat. 1,763,533), chrome alum (U.S. Pat. 1,763,533), glyoxal (German Pat. 538,-713), dibromacrolein (Great Britain Pat. 406,750), etc.), color couplers (e.g., such as those described in U.S. Pat. 2,423,730, Spence and Carroll U.S. Pat. 2,640,776, issued June 2, 1953, etc.), or mixtures of such addenda. Dispersing agents for color couplers, such as substantially water-insoluble, high boiling crystalloidal materials, such as those set forth in U.S. Pats. 2,322,027 and 2,304,940, can also be employed in the above-described emulsions.

In the manner described above, a number of the dyes of this invention represented by Formula I above are separately incorporated in an ordinary gelatino-silver-chlorobromide emulsion, the dyes being added in the form of a solution. The dyes are then thoroughly incorporated in the emulsions by stirring. After a short digestion, the emulsions are coated onto ordinary cellulose acetate film supports and the coating exposed in a spectrograph and sensitometer and then developed in Kodak D-19 developer solution and fixed in an alkaline thiosulfate bath. The sensitizing range and maximum absorption for several typical dyes are indicated in the following table.

| Dye of Example: | Range in mμ | Maximum in mμ |
|---|---|---|
| 1 | 530–760 | 695 |
| 2 | 630–840 | 785 |
| 3 | 710–850 | 825 |
| 4 | 550–790 | 740 |
| 5 | 680–860 | 820 |
| 6 | 740–880 | 840 |
| 7 | 720–850 | 820 |
| 8 | 690–840 | 820 |
| 9 | 810–840 | 820 |

Similarly it can be shown that the other dyes of my invention are valuable spectral sensitizers for use in photography.

My synthesis is valuable for preparing tetranuclear dyes of Formula I because of the good yields of the dye product. Prior art synthesis when applied to the synthesis of my dye 2 gave only a 1% yield compared to the good yield of 29% of dye 2 made by my synthesis.

The invention has been described in detail with particular embodiments thereof, but it will be understood that variations and modifications can be effected within the spirit and scope of the invention as described hereinabove and as defined in the appended claims.

I claim:

1. A process for preparing a tetranuclear dye having the formula:

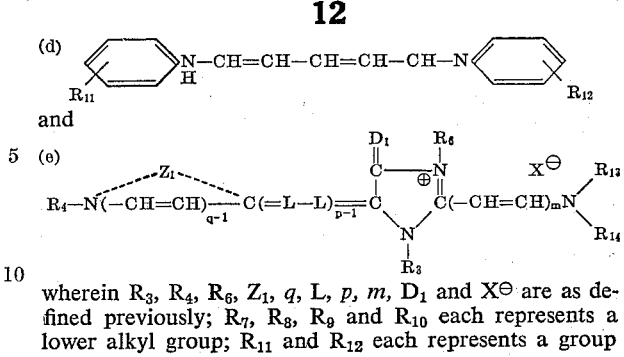

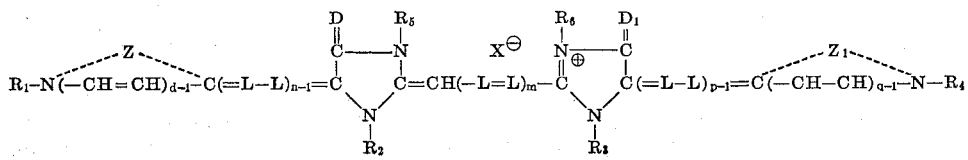

wherein $R_1$ and $R_4$ each represents a group selected from the class consisting of an alkyl group containing from 1 to 12 carbon atoms and phenyl; $R_2$, $R_3$, $R_5$ and $R_6$ each represents a group selected from the class consisting of an alkyl group containing from 1 to 12 carbon atoms and phenyl; D and $D_1$ each represents an atom selected from the class consisting of oxygen, sulfur and selenium; $X^{\ominus}$ represents an anion; $d$ and $q$ each represents an integer of from 1 to 2; $n$, $m$ and $p$ each represents an integer of from 1 to 3; L represents a methine group; Z and $Z_1$ each represents the nonmetallic atoms required to complete a heterocyclic nucleus having from 5- to 6-atoms in the heterocyclic ring selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a pyridine nucleus, a quinoline nucleus, an isoquinoline nucleus, a 3,3-dialkylindolenine nucleus, an imidazole nucleus, a benzimidazole nucleus and a naphthimidazole nucleus, said process comprising the step of heating a mixture of a first compound having the formula:

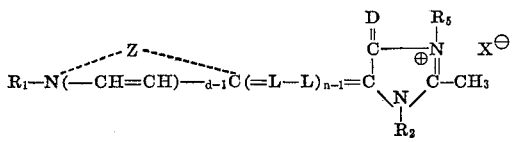

wherein $R_1$, $R_2$, $R_5$, Z, $d$, L, $n$, D and $X^{\ominus}$ are as defined previously with a second compound selected from those having the formulas:

(a)

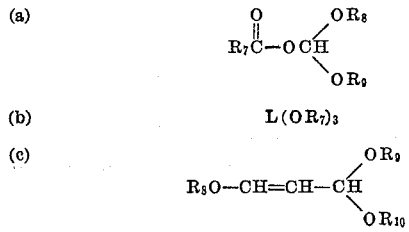

(b) $L(OR_7)_3$ (c) $R_8O-CH=CH-CH(OR_9)(OR_{10})$ (d)

(e)

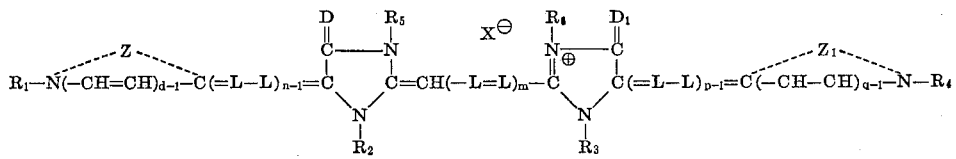

wherein $R_3$, $R_4$, $R_6$, $Z_1$, $q$, L, $p$, $m$, $D_1$ and $X^{\ominus}$ are as defined previously; $R_7$, $R_8$, $R_9$ and $R_{10}$ each represents a lower alkyl group; $R_{11}$ and $R_{12}$ each represents a group selected from the class consisting of hydrogen, lower alkyl and lower alkoxy; $R_{13}$ represents a phenyl group; and $R_{14}$ represents a group selected from the class consisting of hydrogen, benzoyl and a lower alkanoyl group; said reaction being conducted in an organic solvent.

2. A process for preparing a tetranuclear dye having the formula:

wherein $R_1$ and $R_4$ each represents a group selected from the class consisting of alkyl, sulfoalkyl and carboxyalkyl groups having from 1 to 4 carbon atoms, phenyl, sulfophenyl and carboxyphenyl; $R_2$, $R_3$, $R_5$ and $R_6$ each represents a group selected from the class consisting of an alkyl group containing from 1 to 4 carbon atoms and phenyl; D and $D_1$ each represents an atom selected from the class consisting of oxygen, sulfur and selenium; $X^{\ominus}$ represents an anion; $d$ and $q$ each represents an integer of from 1 to 2; $n$, $m$ and $p$ each represents an integer of from 1 to 3; L represents a methine group; Z and $Z_1$ each represents the nonmetallic atoms required to complete a heterocyclic nucleus having from 5 to 6 atoms in the heterocyclic ring selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a pyridine nucleus, a quinoline nucleus, an isoquinoline nucleus, a 3,3-dialkylindolenine nucleus, an imidazole nucleus, a benzimidazole nucleus and a naphthimidazole nucleus, said process comprising the step of heating a mixture of a first compound having the formula:

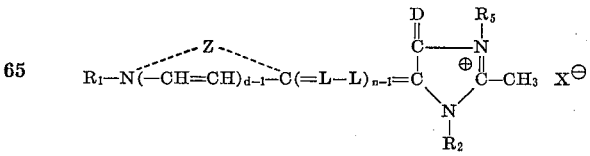

wherein $R_1$, $R_2$, $R_5$, Z, $d$, L, $n$, D and $X^{\ominus}$ are as defined previously with a second compound selected from those having the formulas:

(a)

(b)            $L(OR_7)_3$

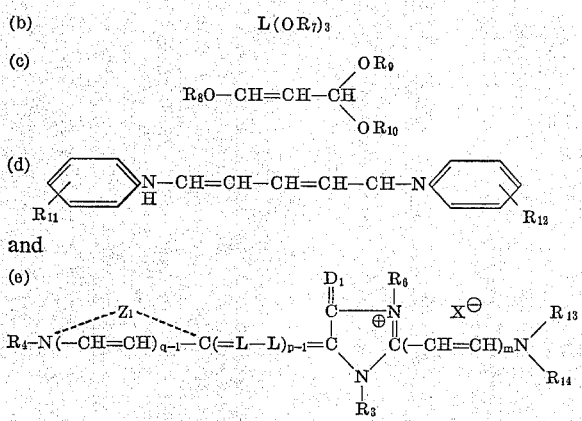

and wherein $R_3$, $R_4$, $R_6$, $Z_1$, $q$, $L$, $p$, $m$, $D_1$ and $X^\ominus$ are as defined previously; $R_7$, $R_8$, $R_9$ and $R_{10}$ each represents a lower alkyl group; $R_{11}$ and $R_{12}$ each represents a group selected from the class consisting of hydrogen, lower alkyl and lower alkoxy; $R_{13}$ represents a phenyl group; and $R_{14}$ represents a group selected from the class consisting of hydrogen, acetyl, propionyl and benzoyl; said reaction being conducted in an organic solvent.

3. A process of claim 2 in which the said second compound has the formula:

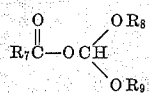

wherein $R_7$, $R_8$ and $R_9$ each represents a lower alkyl group.

4. A process of claim 2 in which the said second compound has the formula:

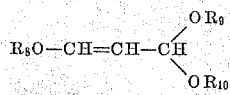

wherein $R_8$, $R_9$ and $R_{10}$ each represents a lower alkyl group.

5. A process of claim 2 in which the said second compound has the formula:

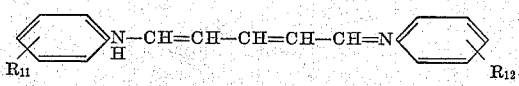

wherein $R_{11}$ and $R_{12}$ are each selected from the class consisting of hydrogen, lower alkyl and lower alkoxy.

6. A process for making 3,3'-diethyl-5,5'-di(3-ethyl-2-benzothiazolinylidene)-4,4'-dioxo - 1,1' - diphenylimidazolinocarbocyanine perchlorate comprising the step of heating a mixture of 3-ethyl-5-(3-ethyl-2-benzothiazolinylidene)-2-methyl-4-oxo-1-phenyl-2-imidazolinium perchlorate and diethoxymethyl acetate in the presence of triethylamine.

7. A process for making 3,3'-diethyl-5,5'-di-[(3-ethyl-2-benzoxazolinylidene)ethylidene] - 4,4' - dioxo-1,1'-diphenyl-imidazolinocarbocyanine iodide comprising the step of heating a mixture of 3-ethyl-5-[(3-ethyl-2-benzoxazolinylidene)ethylidene]-2-methyl - 4 - oxo-1-phenyl-2-imidazolinium iodide and diethoxymethyl acetate in the presence of pyridine.

8. A method for preparing 3,3'-diethyl-5,5'-di(1-ethylnaphtho[1,2-d]thiazolin - 2 - ylidene-4,4'-dioxo-1,1'-diphenylimidazolinocarbocyanine perchlorate comprising the step of heating a mixture of 3-ethyl-5-(1-ethylnaphtho[1,2-d]thiazolin-2-ylidene)-2-methyl-4-oxo - 1 - phenyl-2-imidazolinium perchlorate and diethoxymethyl acetate in the presence of triethylamine.

9. A process for making 3,3'-diethyl-5,5'-di-[(3-ethyl-2-benzothiazolinylidene)ethylidene]-4,4'-dioxo- - 1,1' - diphenylimidazolinocarbocyanine iodide comprising the step of heating a mixture of 3-ethyl-5-[(3-ethyl-2-benzothiazolinylidene)ethylidene]2-methyl - 4 - oxo-1-phenyl-2-imidazolinum iodide and diethoxymethyl acetate in the presence of pyridine.

10. A process for the preparation of 1,1',3,3',-tetraethyl-5,5'-di[(3-ethyl - 2 - benzothiazolinylidene)ethylidene]-4,4'-dioxoimidazolinocarbocyanine iodide comprising the step of heating a mixture of 1,3-diethyl-5-[3-ethyl-2-benzothiazolinylidene)ethylidene]-4-oxo - 2 - imidazolinium iodide and diethoxymethyl acetate in the presence of pyridine.

11. A process for making 3,3'-diethyl-5-[(3-ethyl-2-benzoxazolinylidene)ethylidene] - 4,4' - dioxo - 1,1' - diphenyl-5'-[(1,3,3 - trimethyl-2-indolinylidene)ethylidene] imidazolinocarbocyanine iodide comprising the step of heating a mixture of 3-ethyl-5-[(3-ethyl-2-benzoxazolinylidene)ethylidene]-2-methyl-4-oxo-1-phenyl - 2 - imidazolinium iodide, acetic anhydride and 2-(2-anilinovinyl)-3-ethyl - 4 - oxo - 1 - phenyl-5[(1,3,3-trimethyl-2-indolinylidene)ethylidene]-2-imidazolinium iodide dissolved in pyridine.

12. The process of claim 2 in which said second compound has said formula (e).

References Cited
UNITED STATES PATENTS 2,533,206    12/1950    Dent et al.          260—240.2
2,537,880    1/1951     Dent et al.          260—240.1
3,352,680    11/1967    Taber et al.        260—240.2X JOHN D. RANDOLPH, Primary Examiner U.S. Cl. X.R.

96—106; 260—566